United States Patent
Pinto

(10) Patent No.: US 11,008,737 B1
(45) Date of Patent: May 18, 2021

(54) ATMOSPHERIC WATER CAPTURE SYSTEMS AND METHODS

(71) Applicant: Walber Q. Pinto, Tucson, AZ (US)

(72) Inventor: Walber Q. Pinto, Tucson, AZ (US)

(*) Notice: Subject to any disclaimer, the term of this patent is extended or adjusted under 35 U.S.C. 154(b) by 0 days.

(21) Appl. No.: 15/242,283

(22) Filed: Aug. 19, 2016

(51) Int. Cl.
| | |
|---|---|
| *E03B 3/28* | (2006.01) |
| *F25B 1/00* | (2006.01) |
| *B01D 53/26* | (2006.01) |
| *C02F 1/32* | (2006.01) |
| *C02F 1/00* | (2006.01) |
| *C02F 103/02* | (2006.01) |

(52) U.S. Cl.
CPC .............. *E03B 3/28* (2013.01); *B01D 53/265* (2013.01); *C02F 1/001* (2013.01); *C02F 1/32* (2013.01); *F25B 1/00* (2013.01); *C02F 2103/02* (2013.01)

(58) Field of Classification Search
CPC .............................................. F24F 2003/1446
See application file for complete search history.

(56) References Cited

U.S. PATENT DOCUMENTS

| | | | | |
|---|---|---|---|---|
| 4,050,262 A * | 9/1977 | Mehnert | ............. | B01D 5/0039 203/26 |
| 4,146,372 A | 3/1979 | Groth et al. | ...................... | 55/33 |
| 5,106,512 A | 4/1992 | Reidy | ........................... | 210/744 |
| 5,259,203 A | 11/1993 | Engel et al. | .................... | 62/150 |
| 5,355,946 A * | 10/1994 | Wei | ......................... | F28F 1/02 165/172 |
| 5,553,459 A | 9/1996 | Harrison | ......................... | 62/93 |
| 7,293,420 B2 * | 11/2007 | Max | ..................... | B01D 53/265 62/272 |
| 8,943,843 B2 | 2/2015 | Haryanto et al. | ................. | 62/93 |
| 2005/0097901 A1 * | 5/2005 | Hutchinson | ......... | B01D 5/0039 62/93 |
| 2007/0256430 A1 * | 11/2007 | Prueitt | ................... | B01D 5/006 62/93 |
| 2008/0178625 A1 | 7/2008 | Thompson et al. | ........... | 62/273 |
| 2013/0213865 A1 * | 8/2013 | Hsu | ..................... | B01D 5/0072 210/85 |

OTHER PUBLICATIONS

Honesty & Faith Hardware Products Co., Ltd., "Metal Wire Fan Guard Cover Grills Insure Cooling Fan Safety", Feb. 15, 2016.*

* cited by examiner

*Primary Examiner* — Jianying C Atkisson
*Assistant Examiner* — Nicholas Roth Hector
(74) *Attorney, Agent, or Firm* — Hayes Soloway P.C.

(57) ABSTRACT

A system and method for capturing water from an atmosphere including an air compressor configured to compress air captured from an atmosphere and to receive power from a power source and collecting moisture from the compressed air at an elevated pressure. A first chamber may be used to heat or concentrate the humidity of the air before the air is compressed. A valve assembly maintains the pressure at which the water is captured at an elevated pressure. The humidity of the air may be concentrated before the air is compressed and the moisture of the air is collected.

6 Claims, 2 Drawing Sheets

US 11,008,737 B1

ATMOSPHERIC WATER CAPTURE SYSTEMS AND METHODS

FIELD OF THE DISCLOSURE

The present disclosure is generally related to water capture systems and methods and more particularly is related to systems of capturing water from compressed atmospheric air and methods to capture atmospheric water.

BACKGROUND OF THE DISCLOSURE

Several devices have been previously described for acquiring water from the atmosphere. In general, these devices use refrigeration and refrigerated coils to cool air to its dew point or below in order to collect atmospheric water that condenses on the coils. Typically, these systems are based on a refrigeration device operating according to a vapor compression refrigeration cycle. Such systems may be known as dehumidifiers. In the vapor compression refrigeration cycle, a refrigerant is circulated through a closed circuit cycle of condensation and evaporation to produce a cooling effect. Cooling is accomplished by the evaporation of the liquid refrigerant at low pressure. The refrigerant first enters a compressor where the temperature of the refrigerant is elevated by mechanical compression, such compression turns the refrigerant into a superheated, high pressure vapor. The high pressure vapor is allowed to enter a condenser, where the vapor condenses to a liquid and resultant heat is dissipated to the surroundings. Then, high pressure liquid is allowed to pass through an expansion valve through which fluid pressure and temperature are lowered. Finally, the low-pressure fluid is allowed to enter an evaporator, where the low-pressure fluid is allowed to evaporate by absorbing heat from the cooled space. The resultant vapor is then allowed to reenter the compressor and the cycle is repeated. As air is flowed across the evaporator, the air is cooled below its dew point. Thus, water, in the form of condensation, is obtained as a product of the vapor compression refrigeration cycle. A water collection device may be disposed below the evaporator to collect water that condenses as air is flowed over the evaporator. Often, water capture devices are equipped with various water storage and water purity controlling devices, such as UV lights and filters. Conventional water capture devices may be designed to provide water that is either cooled or heated for the convenience of the user.

The temperature at which evaporated water forms into droplets is called the dew point. In air with relatively low humidity, the dew point may be at or below the temperature at which water freezes. In many desert environments, the dew point is well below 40 degrees for most of the year, often in the single digits. Dehumidifiers in these conditions can rapidly accumulate ice instead of liquid water, clogging the dehumidifier and preventing the dehumidifier from functioning correctly. One way to increase the dew point of air with relatively low humidity is to condense water from the air at an elevated pressure, i.e., a pressure above atmospheric pressure.

SUMMARY OF THE DISCLOSURE

Briefly described, in architecture, one embodiment of the system, among others, can be implemented as follows. A system for capturing water from an atmosphere may include an air compressor configured to receive power from a power source to compress atmospheric air directly from the atmosphere or to compress atmospheric air collected in a first chamber to an elevated pressure. A second chamber is in fluid communication with the air compressor, adapted to collect precipitated water vapor upon expansion of the compressed air and cooling within the second chamber. A valve assembly is adapted to open upon a pressure of the compressed air within the second chamber reaching a pressure value allowing the compressed air to expand and cool in the second chamber, while still maintaining the pressure above atmospheric pressure while the water condenses.

The atmospheric air may be captured in a first chamber and heated by heat source. The second chamber may also include a cooler to facilitate condensation of the compressed air. An ambient air stream may be passed through the heated air in the first chamber. The heated air may pull moisture from the ambient air stream into the first chamber, effectively concentrating the humidity of the heated air in the first chamber. In one embodiment, ambient air is pushed by, for example, a fan through an intake passage and across a gap into an exit passage. Moisture may be full from the ambient air stream while the ambient air is in the gap between the intake passage and the exit passage. A blower may circulate the heated air and direct the heated air at the ambient air stream.

The system according to aspects of the inventive concepts may include a reservoir for collecting precipitated water, the reservoir in fluid communication with the second chamber and may further include a tap for receiving water from the reservoir.

According to aspects, the power source may include one of an internal combustion engine, a solar panel and an electric power grid.

According to a second embodiment of the inventive concepts is a method of for capturing water from an atmosphere which may include the following steps: capturing air from the atmosphere and compressing the air with an air compressor configured to receive power from a power source. The air may be captured and held in a first chamber prior to compressing the air. The air compressed air is received by a second chamber adapted to collect precipitated water vapor upon expansion and cooling of the compressed air within the second chamber. A valve assembly operates to ensure that the water precipitates at an elevated pressure, ensuring that the water does not freeze and affect the operation of the dehumidifier.

Optional steps that may be performed according to aspects of the invention include, but are not limited to: collecting precipitated water in a reservoir and dispensing the precipitated water via an outlet, such as a tap. Other optional steps which may be performed according to aspects of the invention include sensing, by a sensor, one of an air pressure, an air temperature, a carbon level and a relative humidity of the compressed air within the first chamber and/or displaying, on a display, one of the sensed air pressure, the sensed air temperature, the sensed carbon level and the sensed relative humidity of the compressed air within the first chamber.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
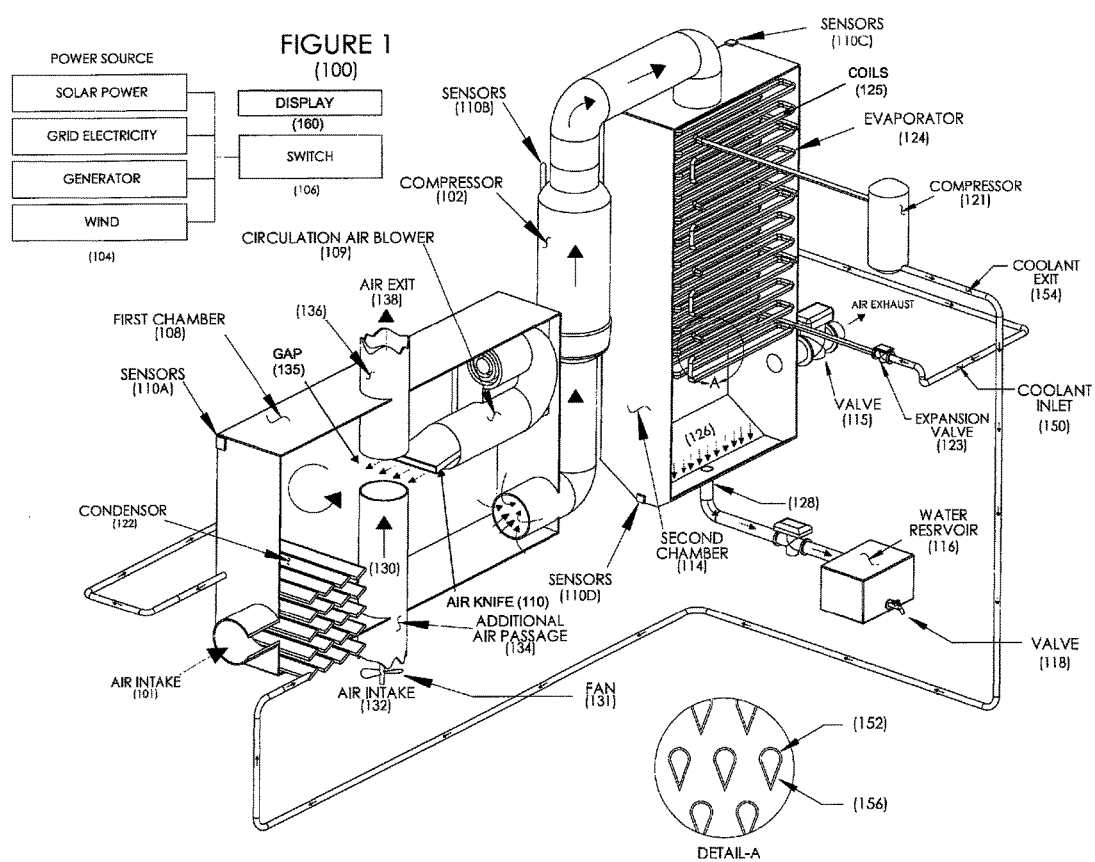
FIG. 1 illustrates a system in accordance with a first exemplary embodiment of the present disclosure.

FIG. 1 illustrates a system 100 for capturing water from the atmosphere. The water capture system 100 includes a refrigeration device 120 operating according to a vapor compression refrigeration cycle. A refrigerant (not shown) enters a compressor 121 where the temperature of the refrigerant is elevated by mechanical compression turning the refrigerant into a superheated, high pressure vapor. The high pressure vapor is allowed to enter a condenser 122, where the vapor condenses to a liquid and resultant heat is dissipated to the surroundings. Then, high pressure liquid is allowed to pass through an expansion valve 123 through which fluid pressure and temperature are lowered. Finally, the low-pressure fluid is allowed to enter an evaporator 124, where the low-pressure fluid is allowed to evaporate by absorbing heat from the cooled space. The resultant vapor is then allowed to reenter the compressor 121 and the cycle is repeated.

Atmospheric water capture system 100 also includes a first chamber 108 for heating air and concentrating humidity. Air passes through the air intake 101 into the first chamber 108 where the air contacts and absorbs heat from the condenser 122. An ambient air stream 130 is passed through the heated air in the first chamber 108 by a propeller 131. Ambient air stream 130 includes an air stream intake 132, an air stream intake passage 134, an air stream gap 135, an air stream exit passage 136, and an air stream exit 138. Hot air in the first chamber 108 is circulated through an air blower 109. In a particular embodiment, the air blower 109 pushes air through an air knife 110 to concentrate the flow of heated air in the air chamber 108. The air blower aims circulating heated air across the air stream gap 135. In one embodiment, the air blower aims air from an air knife that is essentially orthogonal to the ambient air stream 130. The heated air absorbs moisture from the ambient air stream 130, concentrating the humidity of the heated air in the first chamber 108.

First chamber 108 is in fluid communication with an air compressor 102 which may include an air turbine or any appropriate device known in the art for compressing air. Air compressor 102 may be configured to receive heated air from the first chamber 108. Further, air compressor 102 may be configured to receive power from a power source 104. Power source 104 may be a solar power source. Power source 104 may be attached to a power grid, a generator having, for example an internal combustion engine, or power source 104 may receive power from any appropriate source. Further, power source 104 may include a combination of different power sources, such as an internal combustion engine, one or more batteries and/or one or more solar panels, etc.

Without departing from the inventive concepts, power may be acquired by the system 100 as power is available, or by any desired means. Power source 104 may be operated by an on/off switch 106.

First chamber 108 may be attached to first sensor 110A. First sensor 110A may be adapted to sense qualities of the compressed air contained within first chamber 108, such as any or all of temperature, pressure, humidity, etc. First sensor 110A may include multiple sensors or may include a single device. First sensor 110A may be in electronic communication with a processor, a computer or other control device 140 configured to receive information from first sensor 110A. Control device MO is connected to all sensors and controlling all valves, etc., wirelessly, via hard wiring (not shown), or via a combination of wireless and hard wiring. First sensor 110A may further be configured to automatically open valve assembly 115 as discussed below.

A controller 106 turns on the compressor 102 based on input from the first sensor 110A. Compressor 102 passes hot, compressed air from the first chamber 108 to the second chamber 114, as second chamber 114 is in fluid communication with first chamber 108 via the compressor 102. That is, second chamber 114 is adapted for receiving the hot, compressed air from the first chamber upon operation of the compressor 102. The second chamber 114 contains the evaporator 124 of the refrigeration device 120. In second chamber 114, the compressed air is allowed to expand and cool in contact with the evaporator 124, thereby allowing precipitation of water vapor contained in the compressed air onto the coils 125 of the evaporator 124. Evaporator 124 is a refrigerant passage 150 formed into coils 125. In a particular embodiment, the coils 125 in passage 150 have a wider, rounded upper section 152 and a narrower lower section 154. The narrower lower section 154 may narrow to a point 156. Water from the air may condense on the wider upper section 152 and drip down to the narrower lower section 154 and drip down to a water collector 126 at the bottom of the second chamber 114.

Optional second sensor 110B may be adapted to sense qualities of the compressed air contained within air compressor 102, such as any or all of temperature, pressure, humidity, etc. Second sensor 110B may include multiple sensors or may include a single device. Second sensor 110B may be in electronic communication with a processor, a computer or other control device 140 configured to receive information from second sensor 110B.

Optional third sensor 110C may be adapted to sense qualities of the compressed air contained within second chamber 114, such as any or all of temperature, pressure, humidity, etc. Third sensor 110C may include multiple sensors or may include a single device. Third sensor 110C may be in electronic communication with a processor, a computer or other control device 120 configured to receive information from third sensor 110C.

A valve assembly 115 in response to one or the other or both of: a temperature of the compressed air within the second chamber reaching a temperature value and a pressure of the compressed air within the second chamber each reaching a pressure value. Valve assembly 115 may include an expansion valve, such as a thermal expansion valve commonly known in the art. Valve assembly 115 may open automatically or via a control system when a sensed pressure of the compressed air within the second chamber reaches a pressure value. In an optional step according to methods, the temperature value and/or the pressure value may be predetermined or determined in an adaptive manner.

FIG. 1 also illustrates optional reservoir 116. The water collector 126 includes a drain 128 leading to optional reservoir 116. Optional reservoir 116 may be in fluid communication with second chamber 114 via at least one valve (not shown) and an appropriate fluid conduit. Reservoir 116 may be used to store precipitated water received from second chamber 114. The stored water, may be allowed to leave reservoir via tap 118, as illustrated in FIG. 1, or via any other appropriate outlet means.

FIG. 1 shows panel or display 160 which may optionally display values associated with atmospheric air, the air within first chamber 108 or the air within second chamber 114, Qualities displayed on panel 160 may include, but are not limited to, air pressure, air temperature, carbon level and or relative humidity. Such qualities may be sensed by first sensor 110A, second sensor 110E or third sensor 110C. Panel 160 may further be adapted to display values associated with external, atmospheric air.

Figure 2:
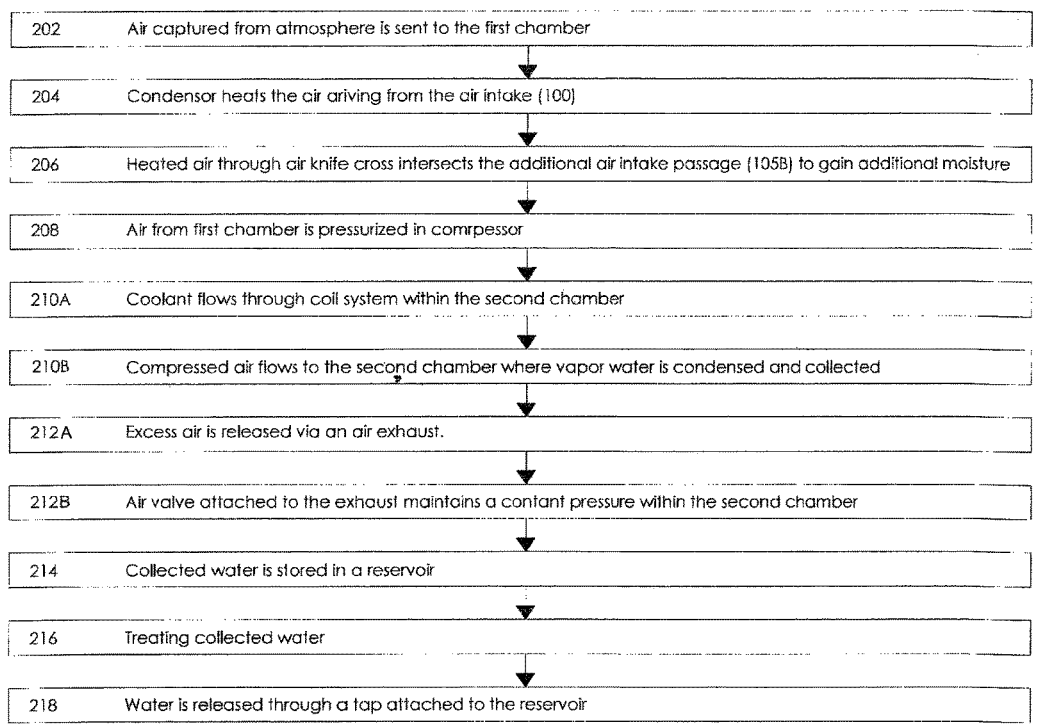
FIG. 2 is block diagram of steps in a method in accordance with a first exemplary embodiment of the present disclosure.

FIG. 2 is a flowchart 200 illustrating a method of capturing water from atmospheric air in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a first step in a method according to aspects of the invention includes capturing air from the atmosphere in a first chamber 108. In the second step 204, the captured air is heated using the condenser 122 of a refrigeration device 120. In the next step 206, an ambient air stream 130 is passed through the first chamber 108 from the air stream intake 132, through the air stream intake passage 134, across the air stream gap 135, into the air stream exit passage 136 and out through the air stream exit 138. Hot air is blown across the ambient air stream 130 and circulated via an air blower 109, absorbing moisture from the ambient air stream and concentrating the humidity of the air in the first chamber 108.

When the air in the first chamber 108 reaches a desired metric or when power is available to the compressor, the compressor 102 is engaged and hot air is pressurized in the compressor and passed to the second chamber 114 in step 208. At step 210A, coolant flows through the evaporator passage 150 within the second chamber 114, and in step 210B compressed air in the second chamber 114 is passed over the evaporator coil 125 where water vapor is condensed.

A subsequent step is illustrated by block 212 and includes opening a valve assembly 115 in response to one or the other or both of: a temperature of the compressed air within the second chamber reaching a temperature value and a pressure of the compressed air within the second chamber each reaching a pressure value. Valve assembly 115 may include an expansion valve, such as a thermal expansion valve commonly known in the art. In step 212a, valve assembly 115 may open automatically or via a control system, upon a temperature of the compressed air within first chamber 108 reaching a temperature value. Further, in step 212h, valve assembly 115 may open, automatically or via a control system, when a sensed pressure of the compressed air within the second chamber reaches a pressure value, keeping the pressure in the second chamber 114 essentially constant. In an optional step according to methods, the temperature value and/or the pressure value may be predetermined or determined in an adaptive manner.

A subsequent step is illustrated in block 214 and includes collecting, by the second chamber 114, precipitated water vapor upon expansion of the compressed air within the second chamber 114.

Other steps that may be performed, include purifying the collected water in a treatment block 216, by any appropriate means, including, but not limited to filtration, aeration and/or chemical or ultraviolet light treatment. Water or treated water can be draw away from the system or to an additional reservoir through a tap at step 218.

The methods according to the present invention may include any additional number of steps or variations thereof, which includes any of the functioning or structures discussed with respect to FIG. 1.

The system 100 provides significant benefits over the prior art.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for capturing water from an atmosphere, comprising the steps of:
   (A) drawing a first ambient air stream from the atmosphere into a first chamber and heating the first ambient air stream;
   (B) passing a second ambient air stream in contact with the heated first ambient air stream in the first chamber whereby moisture carried by the second ambient air stream is picked up by the heated first ambient air stream;
   (C) compressing the heated first ambient air stream with the added moisture from step (B);
   (D) receiving the compressed air from step (C) in a second chamber and allowing the compressed air to expand and cool in the second chamber to precipitate moisture from the resulting cool air; and
   (E) collecting precipitated moisture resulting from the expansion of the compressed air within the second chamber.

2. The method of claim 1, comprising: heating the first ambient air stream with a heat source in the first chamber, and cooling the compressed air with a cooler in the second chamber.

3. The method of claim 2, further comprising providing a refrigeration device with a condenser and an evaporator, wherein the heat source is the condenser of the refrigeration device and the cooler is the evaporator of the refrigeration device.

4. The method of claim 1, further comprising:
   sensing, by a sensor, one of an air pressure, an air temperature, a carbon level and a relative humidity of the compressed air within the second chamber.

5. The method of claim 4, further comprising displaying, on a display, one of the sensed air pressure, the sensed air temperature, the sensed carbon level and the sensed relative humidity of the compressed air within the second chamber.

6. The method of claim 2, further comprising sensing, by a sensor, one or an air pressure, an air temperature, a carbon level and a relative humidity of the heated first ambient air stream with the added moisture in the first chamber before compressing the air.

\* \* \* \* \*